United States Patent [19]

Zielke

[11] 4,216,052
[45] Aug. 5, 1980

[54] AUTOMATIC THREADING MECHANISM FOR A CASSETTE LOADER

[75] Inventor: Darrell W. Zielke, Valencia, Calif.

[73] Assignee: West American Sound, Inc., North Hollywood, Calif.

[21] Appl. No.: 956,219

[22] Filed: Oct. 30, 1978

[51] Int. Cl.² ............................................ B65H 19/00
[52] U.S. Cl. .................................... 156/502; 156/506; 242/56 R
[58] Field of Search ............... 156/502, 505, 506, 459; 242/56 R, 58.4

[56] References Cited

U.S. PATENT DOCUMENTS

| | | | |
|---|---|---|---|
| 4,061,286 | 12/1977 | King et al. | 156/502 X |
| 4,062,719 | 12/1977 | Masuzima et al. | 156/506 X |
| 4,136,838 | 1/1979 | Bosco | 242/56 R |

*Primary Examiner*—David A. Simmons
*Attorney, Agent, or Firm*—Lyon & Lyon

[57] ABSTRACT

A mechanism for threading cassette leader onto an automatic cassette splicer and loader. The threader with the automatic splicer and loader requires no manual intervention once the cassette is placed thereon and the cycle is initiated. The threader includes a leader pickup mechanism for drawing a loop of leader from a cassette, a leader placement assembly which engages the loop and extends the leader over a vacuum track, and a tape guide assembly including an arm to pivotally move one side of the loop away from the vacuum track of the splicer and loader and a guide plate adjacent the vacuum track to prevent tape from catching on the vacuum track. These various devices are driven pneumatically by means of a cam and pneumatic switch assembly.

20 Claims, 13 Drawing Figures

AUTOMATIC THREADING MECHANISM FOR A CASSETTE LOADER

BACKGROUND OF THE INVENTION

The present invention is directed to cassette loaders. More specifically, the present invention is directed to a mechanism for threading cassette leader onto an automatic cassette splicer and loader.

With the ever increasing availability to and use by the consumer public of sophisticated electronic devices, pre-recorded audio magnetic tape has become more and more popular. One form in which this tape is commonly supplied is in what has come to be known as an audio cassette. Such audio cassettes are supplied by the manufacturers of same with leader permanently threaded to each reel of the cassette. This leader is continuous and requires cutting at a mid-point thereof and splicing in of either a blank or pre-recorded length of magnetic tape. The cost of manually splicing in a length of magnetic tape is prohibitive from a commercial standpoint. Consequently, machines have been developed to automatically splice and load magnetic tape into such cassettes.

The automatic splicing and loading mechanisms have heretofore required threading by an operator. This is accomplished by the operator placing the cassette on the machine and drawing a loop of the leader from the cassette onto a vacuum track. Once this loop is placed on the track, the machine will automatically complete the splicing and loading operations. Consequently, it has been found economical to have one operator thread and oversee several machines at one time. In this way, the operator may be threading one machine while the remaining machines are continuing through the cycle of splicing and loading tape onto the cassette. Naturally, the more machines the operator can control, the greater the productivity of the operator.

A number of mechanisms are available for such splicing and loading. One example is illustrated in U.S. Pat. No. 3,848,825. As can be seen from FIG. 10, a loop of leader is drawn across a vacuum track to initiate operation. The sequence of splicing and loading of tape once threaded onto such a mechanism is not part of the present invention and disclosure of U.S. Pat. No. 3,848,825 is incorporated herein by reference to illustrate one such sequence of operation.

SUMMARY OF THE INVENTION

The present invention is directed to a mechanism for further automating automatic splicing and loading devices by providing automatic threading. By the present invention, an operator is able to service a larger number of machines because it is only necessary to place the unloaded cassette on the machine and press the start button.

To accomplish the foregoing, the present invention includes a mechanism for drawing a loop of leader from an unloaded cassette. Once such a loop of leader has been drawn from the cassette, a leader placement assembly engages the loop and draws leader up over a vacuum track. An additional mechanism holds one side of the loop drawn from the cassette outwardly away from the mechanism to prevent interference by that part of the tape with the splicing and loading operation. Guides are also provided to insure proper placement and retraction of the leader and magnetic tape during the complete operation. The several functions are carried out by means of a system including a cam mechanism to operate pneumatic cylinders.

Accordingly, it is an object of the present invention to provide an automatic threading mechanism for a cassette loader.

It is another object of the present invention to provide an improved mechanism for drawing a loop of leader from a cassette.

It is yet another object of the present invention to provide a mechanism for drawing leader of a cassette onto a conventional vacuum track.

It is a further object of the present invention to provide a threading mechanism which so guides the leader and magnetic tape that high reliability is achieved.

Other objects and advantages will appear hereinafter.

DETAILED DESCRIPTION OF THE PREFERRED EMBODIMENT

Figure 1:
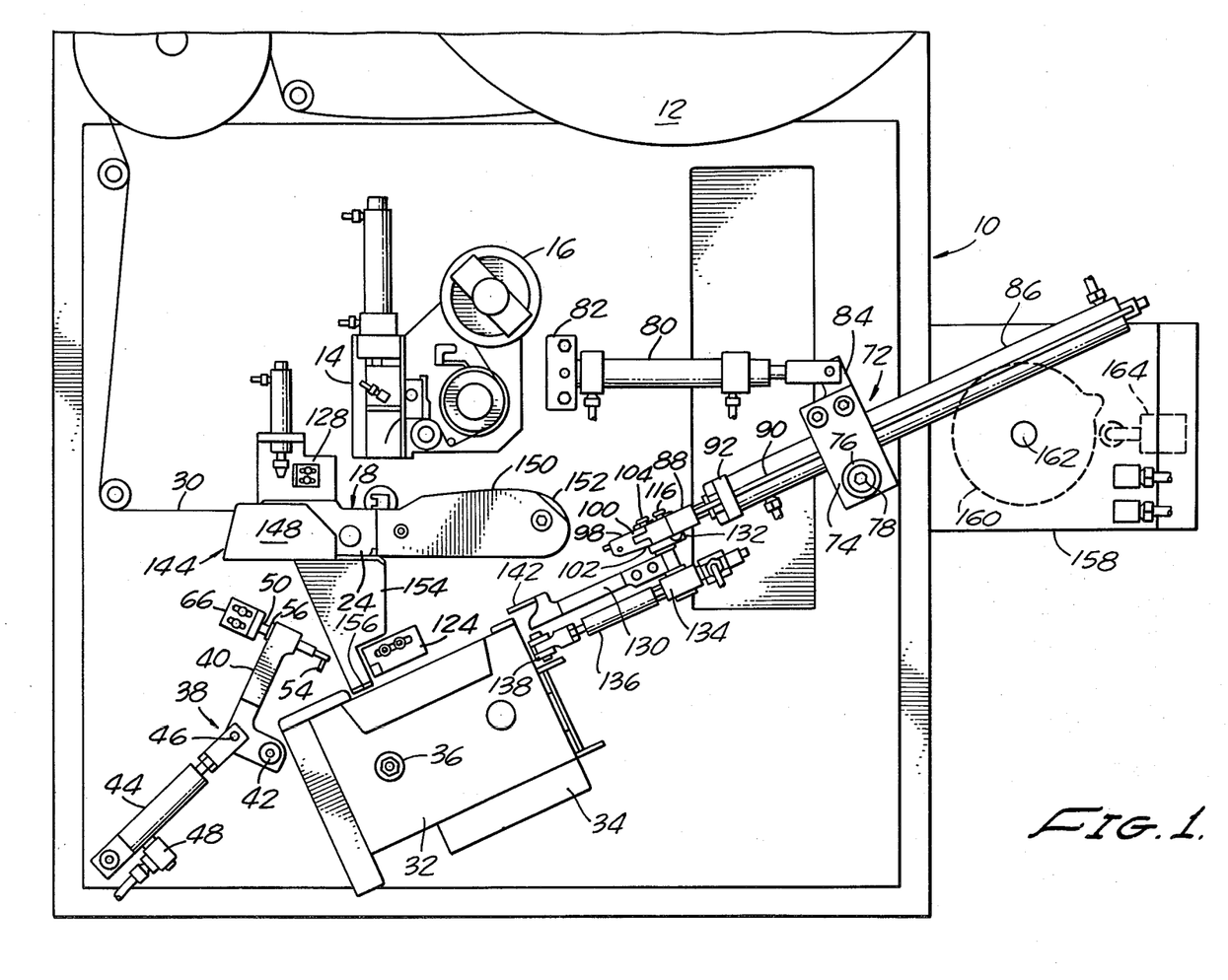
FIG. 1 is a front view of an automatic cassette loader illustrating the present invention in its rest position.
Figures 2, 3, 4, 6, 7:
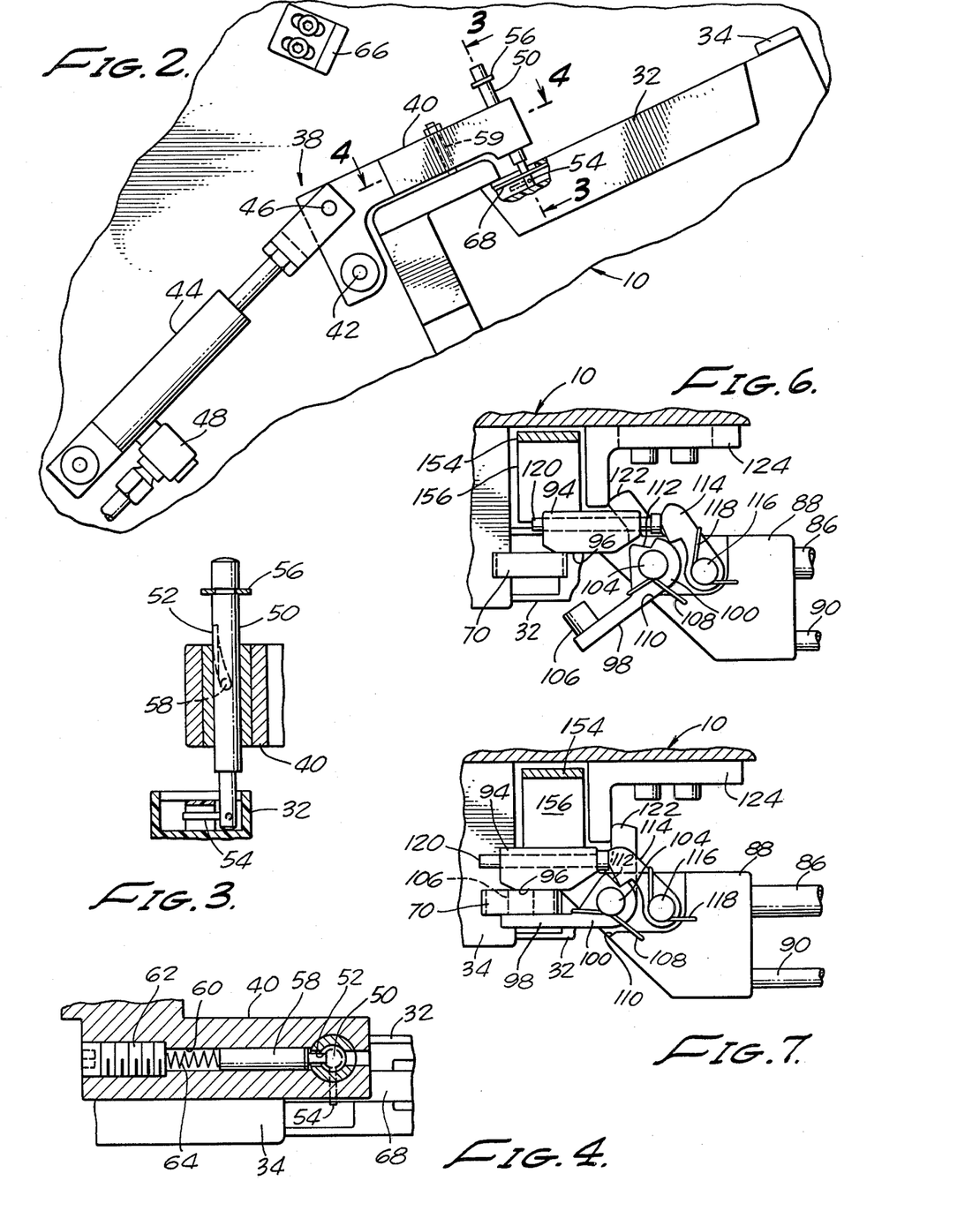
FIG. 2 is a front detail of the leader pickup mechanism of the present invention shown inserted into a cassette.
FIG. 3 is a cross-sectional view taken along line 3—3 of FIG. 2.
FIG. 4 is a cross-sectional view taken along line 4—4 of FIG. 2.
FIG. 6 is a detailed plan of a leader placement head of the present invention shown ready to engage a loop of leader.
FIG. 7 is a the plan view of FIG. 6 with a leader placement head of the present invention shown engaging a loop of leader.

Turning in detail to the drawings, FIG. 1 provides an overview of the present mechanism in the environment of a cassette loader. The cassette loader generally designated 10, includes a box-like frame having a source of magnetic tape 12, a cutting and splicing mechanism 14 having its own supply of splicing tape 16, and a tape splicing guide 18.

Figures 12, 13:
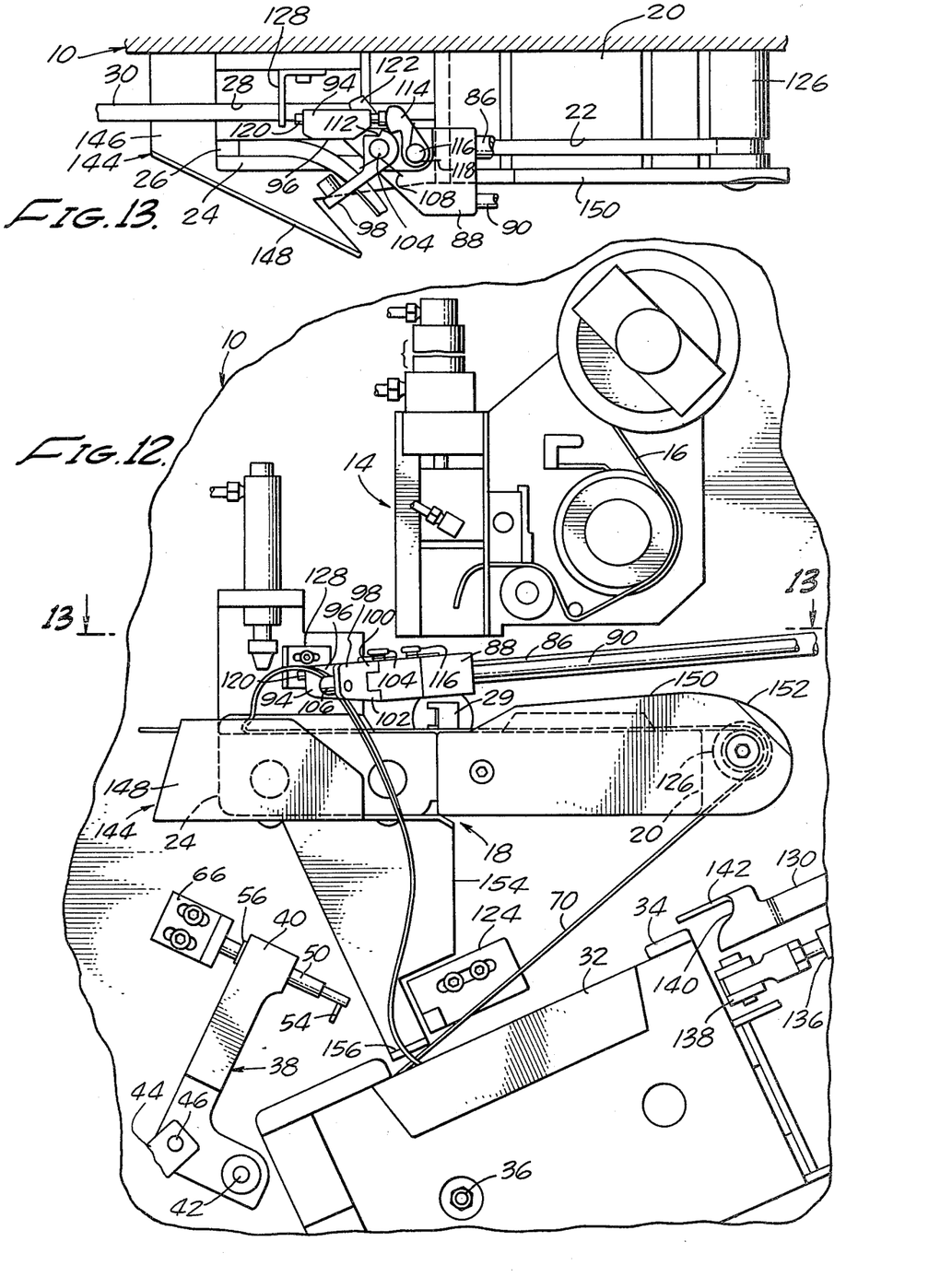
FIG. 12 is a front view of the automatic threading mechanism showing the leader in its placement position for splicing.
FIG. 13 is a plan view taken along line 13—13 of FIG. 12.

The tape splicing guide 18 can be seen in greater detail in FIG. 13 as including a first guide block 20 having a vacuum track 22. The guide block 20 is fixed relative to the front of the cassette loader 10 and employs vacuum ports (not shown) in the vacuum track 22 to hold leader from a cassette mounted on the mechanism. A splicing block 24 includes two vacuum tracks 26 and 28. The first vacuum track 26 is initially aligned with the vacuum track 22 of the first guide block 20. Thus, leader may be extended across the first guide block 20 in the vacuum track 22 and the splicing block 24 in the vacuum track 26. When the leader has been placed in such a position, it is considered to have been threaded onto the mechanism.

The cutting and splicing mechanism 14 includes a cutter 29 which then acts to cut the leader. The splicing block 24 then moves outwardly from the cassette loader 10 to align the vacuum track 28 with the vacuum track 22. One end of the magnetic tape 30 to be threaded onto the cassette is located in the vacuum track 28 which becomes aligned with the portion of the leader remaining in vacuum track 22. The cutting and splicing mechanism 14 then splices this tape 30 to the leader and the appropriate length of magnetic tape 30 is wound into the cassette. At the end of the selected length of magnetic tape 30, the cutting and splicing mechanism 14 cuts the tape 30 and the splicing block 24 returns to its original position. At this point the other half of the leader located in vacuum track 26 is aligned with the end of the magnetic tape 30 which has been drawn into the vacuum track 22. The cutting and splicing mechanism 14 then splices these tapes together. The cassette then is caused to receive the last loop of magnetic tape and leader and pops from the machine. The cassette loader 10 may then be loaded with another cassette.

The cassette 32 is mounted on the face of the cassette loader 10 in conventional brackets 34. Only one reel 36 need be driven. A mechanism located behind the cassette 32 is employed to pop the cassette 32 from the cassette loader 10 when the loading has been completed. The basic cassette loader 10, the cutting and splicing mechanism 14, the tape splicing guide 18 and the cassette and cassette mounting brackets 34 and all of the immediately attendant mechanisms are of conventional design.

Turning then to the novel mechanisms of the present invention, a leader pickup assembly, generally designated 38 is illustrated for drawing a small loop of leader from the cassette 32. The leader pickup assembly 38 includes an arm 40 pivotally mounted on a pin 42 to the face of the cassette loader 10. A means for pivotally moving the arm 40 is provided by pneumatic cylinder 44. The pneumatic cylinder 44 is pinned at one end to the cassette loader 10; and the rod end of the cylinder is pinned by pin 46 to the arm 40 at a point spaced from the pivotal mounting of the arm 40. The cylinder 44 is preferably double acting to extend and retract the arm 40. Consequently, addition of pressurized air through air inlet 48 causes the arm 40 to rotate in a clockwise direction as viewed in FIG. 1.

FIGS. 2 through 5 best illustrate the leader pickup assembly 38.

At the distal end of the arm 40, a shaft 50 is slidably mounted. The shaft is oriented substantially tangentially to the movement of the arm 40 at the shaft 50. Thus, the shaft 50 moves with the arm 40 substantially along the axis of the shaft, albeit in an arc. The shaft 50 includes a helical groove 52 along a portion of its length. A pin 54 is located adjacent one end of the shaft and extends perpendicularly from the axis of the shaft. Near the opposite end of the shaft 50, there is a spring clip 56 to limit movement of the shaft 50.

Located in the arm 40 is a follower consisting of a pin 58 which extends to fit into the helical groove 52. The pin 58 is located in a bore 60 which has been partially tapped to receive a set screw 62. A spring 64 retains the pin 58 in the helical groove 52.

The orientation of the helical groove 52, the pin 54 and the pin 58 are such that the shaft rotates approximately 90° as it moves between the spring clip 56 and the far extent of the helical groove 52. With the spring clip 56 against the arm 40, the pin 54 extends parallel to the cassette 32 and the leader therein. An adjustable set screw 59 is employed to stop the arm 40 such that the pin 54 extends perpendicularly to the cassette and to the leader therein. This orientation enables the leader pickup assembly to engage the leader and draw a loop of same from the cassette.

Figure 5:
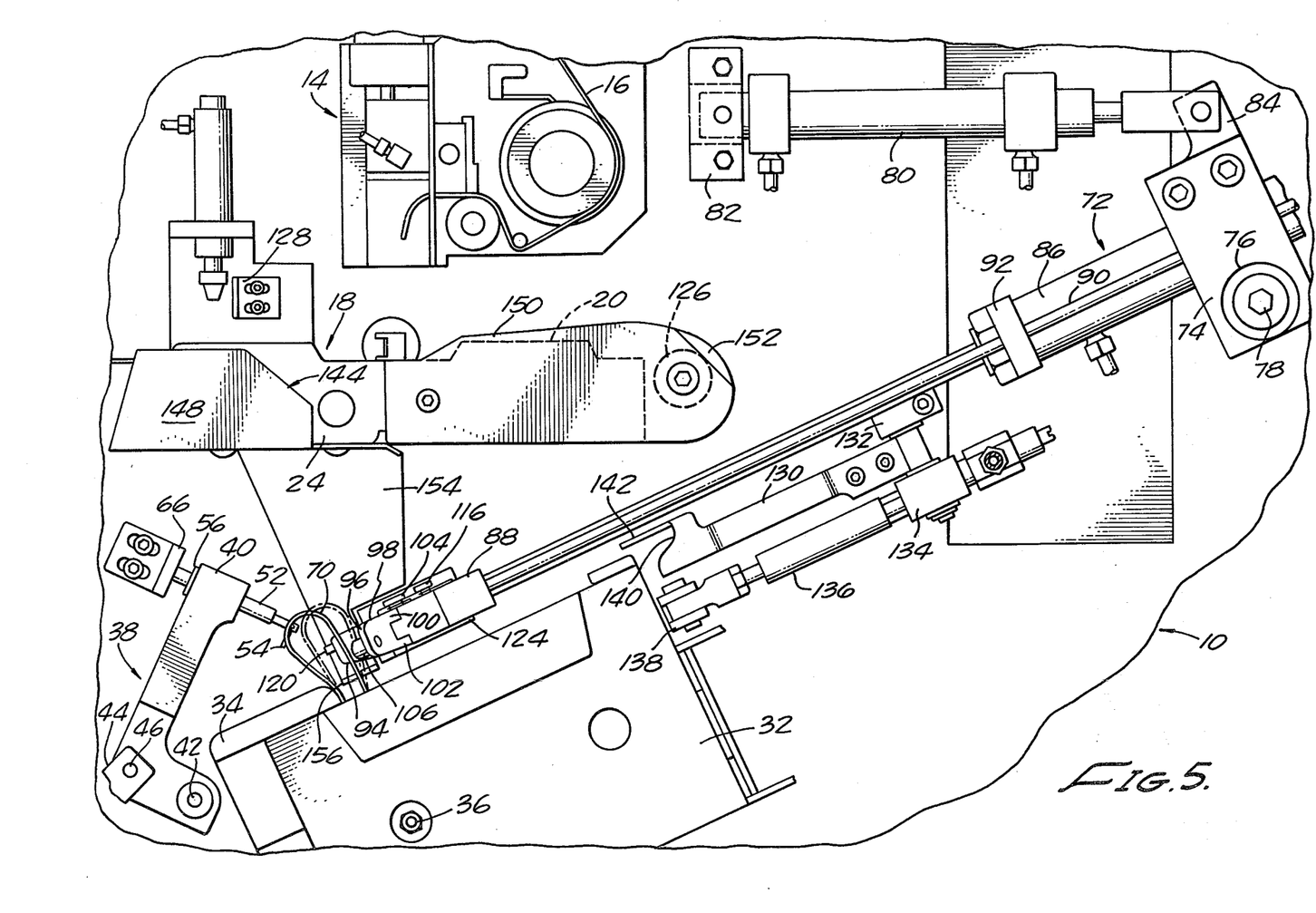
FIG. 5 is a front view of the threading mechanism with a loop of leader drawn from a cassette.

The shaft 50 works in combination with a stop 66 to orient the pin 54 parallel to the leader. This is accomplished by movement of the arm 40 in a counter-clockwise direction away from the cassette. The end of the shaft 50 is forced through the arm 40 by the stop 66 until the spring clip 56 prevents further movement. Upon actuation of the pneumatic cylinder 44, the arm 40 rotates to the cassette 32 with the pin 54 parallel to the leader in the cassette. This enables the end of the shaft 50 to extend down past the leader to come to rest against the body of the cassette 32. The arm 40 continues to advance with the shaft 50 against the body of the cassette 32. This movement of the arm 40 rotates the pin 54 into a position beneath the leader. This may be best seen in FIGS. 3 and 4 where the pin 54 is shown beneath a leader 68. Once pressure is released from the pneumatic cylinder 44, the arm returns to its rest position and draws a loop of leader from the cassette. Upon encountering the stop 66, the pin 54 is rotated out of the way of the loop for the next process. This final position is illustrated in FIG. 5 where a loop 70 of leader is shown as it is drawn out by the arm 40 and is shown in phantom after being released by the leader pickup assembly.

Once the loop 70 has been formed, a leader placement assembly 72 draws this loop into a threaded position on the vacuum track 22 and vacuum track 26 of the first guide block 20 and the splicing block 24 respectively. The initial, at rest position of the leader placement assembly 72 is shown in FIG. 1. FIG. 5 illustrates the leader placement assembly 72 in its extended position in preparation for receiving the loop 70. FIGS. 8, 9, 10, 12 and 13 demonstrate the leader placement assembly 72 in its successive locations after having received the loop 70.

Figure 10:
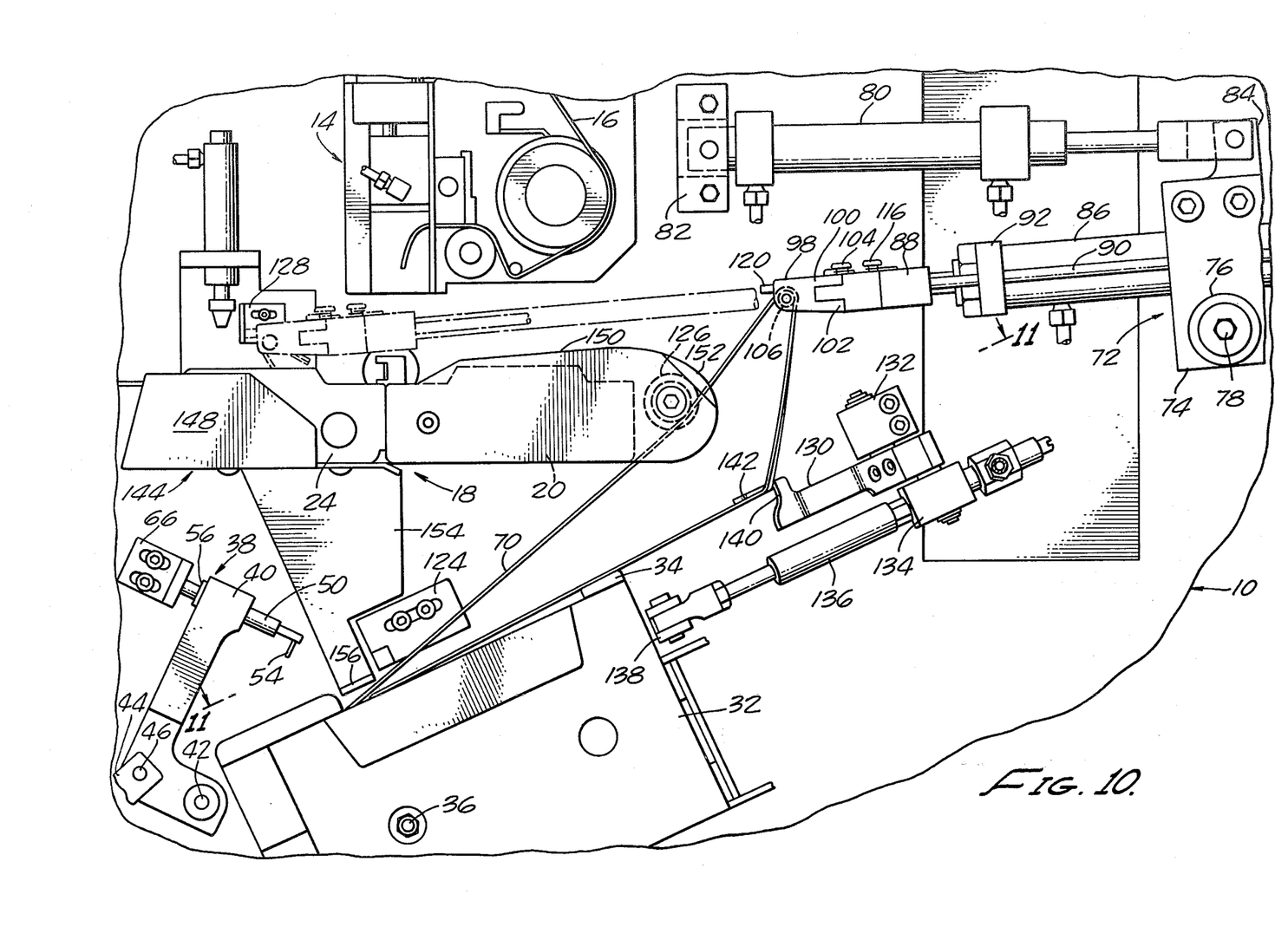
FIG. 10 is a front view of the threading mechanism with a leader placement head shown ready to extend, as illustrated in phantom, in placement of a leader.

The leader placement assembly 72 includes a mounting block 74 having a bushing 76 therein. The bushing 76 cooperates with a shoulder bolt extending from the face of the cassette loader 10 for pivotal mounting of the leader placement assembly 72. The block is retained on the bolt by means of the head 78 of the bolt. The block 74 is pivotally controlled by means of a pneumatic cylinder 80 which is pinned at a first end to the face of the cassette loader 10 at bracket 82 and is pinned to an extension 84 of the mounting block 74 at the piston end of the cylinder 80. The pneumatic cylinder 80 is of the double acting type such that the leader placement assembly 72 may be driven to either of two pivotal extremes as can be seen in FIG. 1 and FIG. 10.

Mounted within the mounting block 74 is a pneumatic cylinder 86. Attached to the piston rod thereof is a leader placement head 88 which can be extended or retracted by the pneumatic cylinder 86. A second rod 90 extends parallel to the piston shaft of the pneumatic cylinder 86. A guide bracket 92 retains the rod 90 parallel to the pneumatic cylinder 86 and in a fixed angular orientation with respect to the mounting block 74. The rod 90 also extends through a hole provided for in the mounting block 74 for further guidance.

The leader placement head 88 includes a jaw assembly having a first jaw 94 fixed relative to the leader placement head 88. In this embodiment, the first jaw 94 is an integral part of the leader placement head 88. The first jaw 94 has a smooth inner surface 96 without protrusions. Thus, this jaw does not provide any means by which leader could be caught. The end of this first jaw 94 is beveled to further promote facile acceptance and release of the leader.

Pivotally mounted on the reader placement head 88 is a second jaw 98. This second jaw extends rearwardly as to clevis lugs 100 and 102 to accept a clevis pin 104 about which the second jaw 98 pivots. The second jaw further includes a cylindrical protrusion in the form of a pin 106 extending inwardly toward the first jaw 94. This pin 106 is of sufficient width to accept the leader such that the leader may slide over the pin 106 during placement thereof.

Control of the second jaw 98 is provided by a number of means. First, a spring 108 biases the second jaw toward the open position as can best be seen in FIG. 6. An upstanding surface 110 on the leader placement head 88 prevents further opening of the second jaw 98. In the closed position, a lock is provided to hold the second jaw 98 against the bias of the spring 108. Located on the clevis lug 100 is a notch 112 which receives a pawl 114. The pawl 114 is pivotally mounted to the leader placement head 88 by pin 116. A spring 118 holds the pawl in the notch 112 when the second jaw 98 is closed. This can best be seen in FIG. 7.

A release is provided by means of a pin 120 extending through the first jaw 94. The pin is capable of moving longitudinally therein to force the pawl 114 away from the notch 112. With the lock release, the spring 108 will sharply open the second jaw 98 to release a leader contained therein.

To close the jaw assembly, the clevis lug 102 includes an extending lever 122 which extends laterally beyond the body of the leader placement head 88. When this lever 122 is forced rearwardly relative to the leader placement head 88, the second jaw 98 is closed.

The configuration of the jaw mechanism is designed to insure fascile grasping and release of a leader loop. By locating the pin 106 on the second jaw 98 which is able to pivot open, the pin 106 becomes oriented to insure release of the leader loop when desired. The rigid first jaw 94 retains its orientation to insure proper guidance of the loop into the jaw assembly. To further insure this engagement of the leader loop when desired, the rod 90 is hollow and is supplied with a source of compressed air at the back end thereof. A hole is provided through the body of the leader placement head 88 to a position between the two jaws 94 and 98. During release of the leader from the jaws, a stream of compressed air is directed to the leader to force it from the jaws and onto the vacuum tracks 22 and 26.

In its operation, the leader placement assembly 72 first is pivoted to the lower position as can be seen in FIG. 1. The leader placement head 88 is then extended to the loop 70 of leader extending from the cassette 32. As the leader placement head 88 comes into a position for receiving the loop 70, a stop 124 is encountered by the lever 122. As the leader placement head 88 continues forward, the lever 122 is forced to pivot and close the second jaw 98 about the loop 70.

Figure 8:
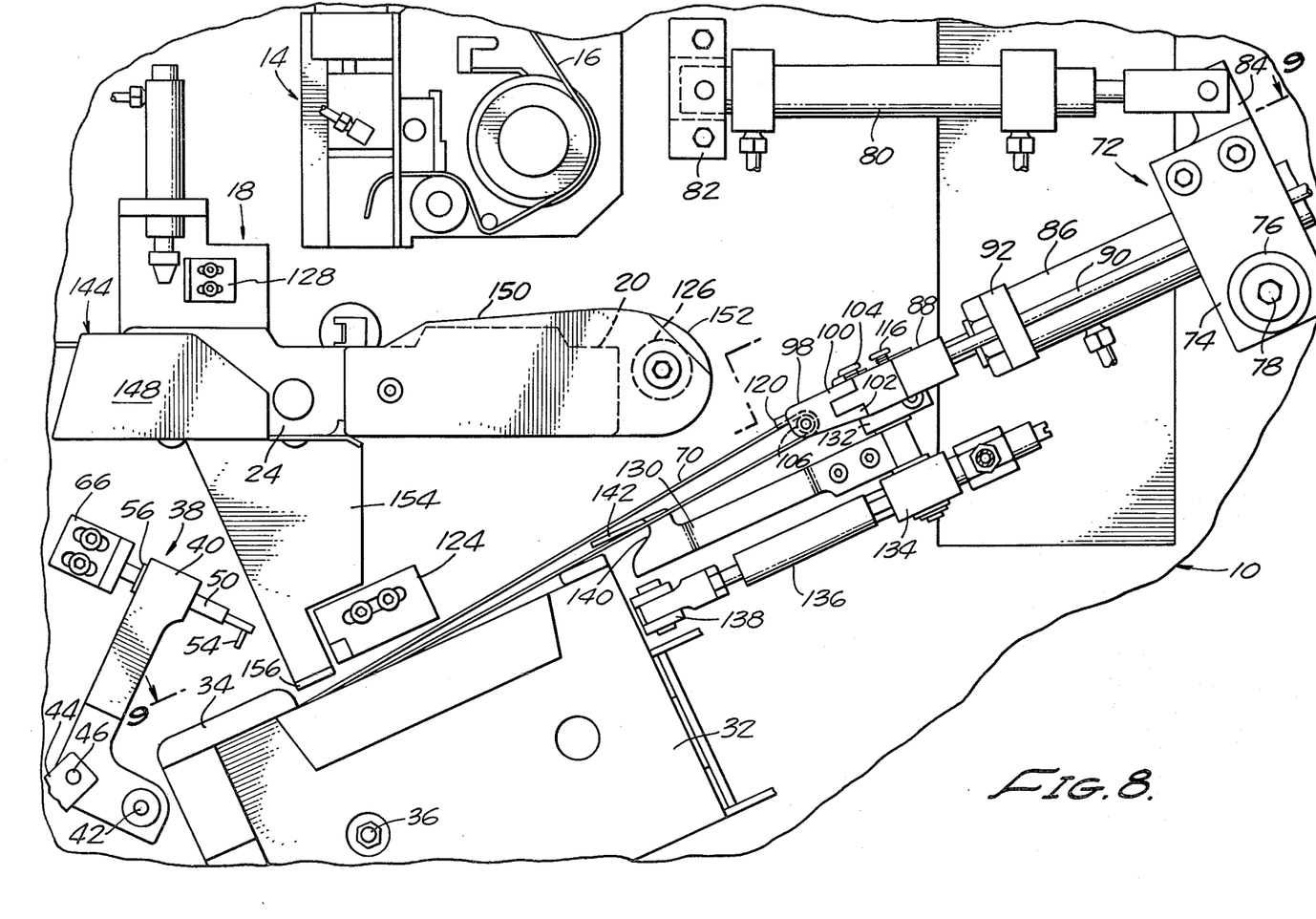
FIG. 8 is a front view of the automatic threading mechanism showing a leader placement head in its retracted position with a loop of leader.
Figure 9:
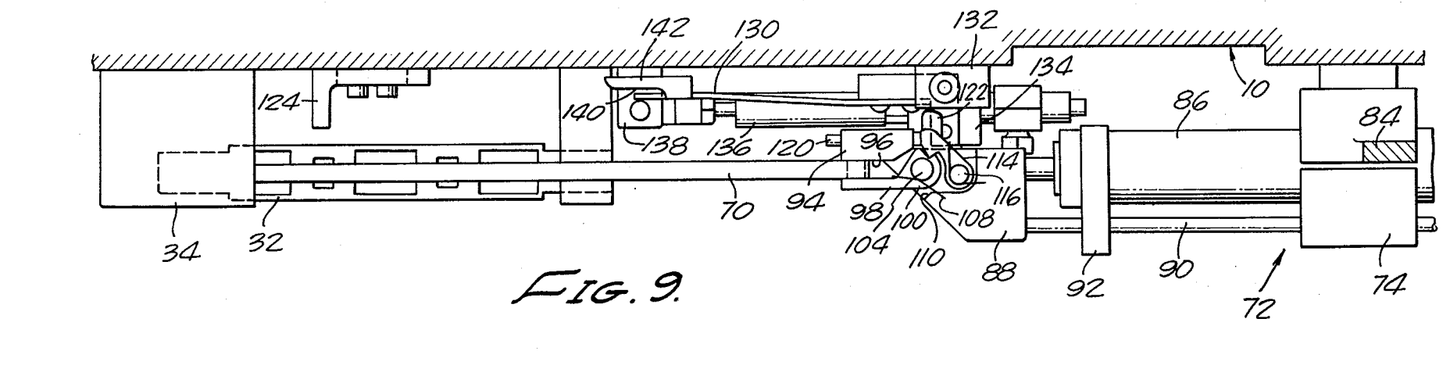
FIG. 9 is a plan view of the threading mechanism shown in the position illustrated in FIG. 8.

The leader placement head 88 is then retracted with the loop 70 as can best been seen in FIG. 8. Once in this retracted position, the leader placement head 88 is raised by means of the pneumatic cylinder 80 to the position illustrated in FIG. 10. At this point, one side of the loop 70 comes into contact with a guide roller 126. The guide roller 126 includes a groove aligned with the vacuum track 22 of the first guide block 20. The leader placement head 88 is then extended again, as can be seen in phantom in FIG. 10. The vacuum track 22 attracts the leader and it becomes positioned thereon as can best been seen in FIG. 12.

At the end of the path of travel of the leader placement head 88 as it moves across the vacuum track 22 there is a stop 128. This stop is designed to interfere with the protruding end of the release pin 120 which in turn disengages the pawl 114 to allow the second jaw 98 to open. This condition is best seen in FIG. 12. At this time, the jet of air provided through the rod 90 insures that the leader is disengaged from the leader placement head 88 and is drawn over the vacuum track 26 in proper position for splicing. The leader placement head 88 is then retracted and returned to its lower most position in preparation for the next cycle.

In placing the loop of leader on the vacuum track, it is necessary that only one side of the loop is so positioned. The other side of the loop must avoid the cutting and splicing area of the cassette loader 10. To accomplish this, several mechanisms have been devised. A tape guide assembly is employed to draw one side of the leader loop outwardly away from the mechanism. This guide mechanism includes an arm 130 pivotally mounted to the face of the cassette loader 10 such that the axis of pivotal movement of the arm 30 is parallel to the plane of the front surface of the cassette loader 10. To this end, a mounting block 132 is fixed to the face of the cassette loader 10. This mounting block forms a bearing for the pivotal mount of the arm 130 with an axis parallel to the face of the cassette loader 10.

To cause the arm 130 to pivot, the arm is attached to a drive block 134 through an axis parallel to and spaced from the axis through the mounting block 132. The drive block is fixed to a pneumatic cylinder 136. The other end of the pneumatic cylinder 136 is fixed by means of a bracket 138 to the face of the cassette loader 10. The pneumatic cylinder 136 is spring loaded to a retracted position such that the addition of air elongates the cylinder. In this way, the arm 130 may be forced outwardly away from the face of the cassette loader 10.

Figure 11:
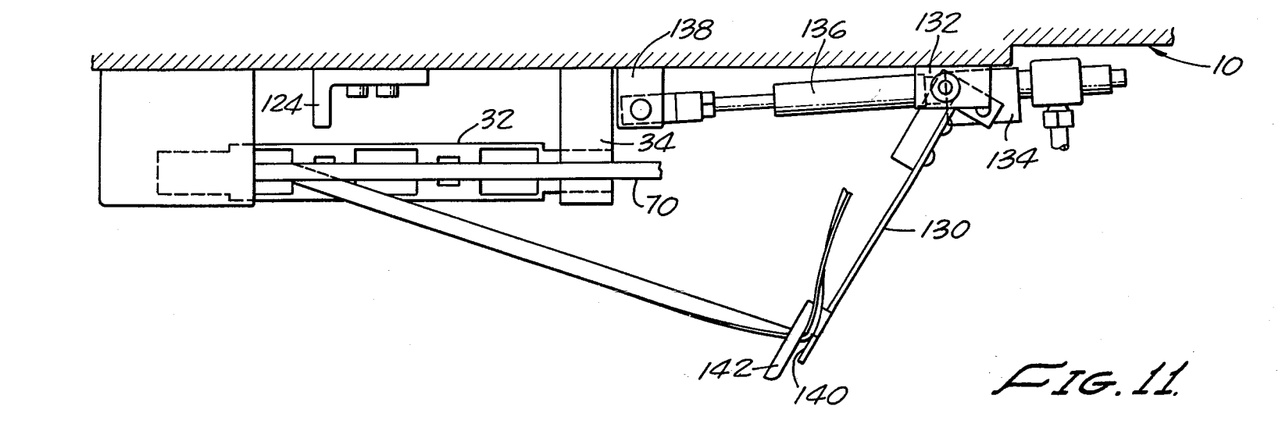
FIG. 11 is a plan view of a tape guide assembly with one side of the loop of leader drawn away from the mechanism.

The arm 130 includes a notch 140 defined by a finger 142 which extends upwardly and then outwardly from the arm 130 as can be seen, for example, in FIGS. 8 and 11. As also can be seen in FIG. 8, the leader placement head 88 retracts to a position during its movement where one side of the leader loop being drawn by the leader placement head 88 lies in the path of the finger 142. At this point, the arm 130 is pivoted outwardly from the face of the cassette loader 10 as can be seen in the sequence drawings of FIGS. 9 and 11. As best seen in FIG. 10, the leader placement head 88 then continues its path with one side of the leader falling into the guide roller 126 and the other side of the loop being held away from this area. The finger 142 is capable of retaining the second side of the loop until the leader placement head 88 has advanced sufficiently to draw this second side of the loop from the finger 142 past the outside of the assembly including the vacuum track 22. At this point, the tape cannot become entangled or drawn over onto the vacuum tracks.

Eventually, the leader is released by the arm 130 and assumes a position as illustrated in FIGS. 12 and 13. To insure proper placement of the leader once released by the arm 130, a guide 144 has been fixed to the splicing block 24. This guide includes a first bottom plate 146 which is juxtaposed with the bottom of the splicing block 24. The plate 146 extends to an edge outwardly of the splicing block 24 and is cut at an angle such that it intersects and extends beneath the first guide block 20. This bottom plate 146 is thus able to keep the loose portion of the leader away from the splicing block 24 and away from the joint between the splicing block and the first guide block 20. The guide 144 also includes an upwardly and outwardly extending plate 148 which helps define a notch between the plate 148 and the plate 146. The plate 148 extends outwardly such that the leader will not loop over the top of the plate and become entangled. The notch defined by the two plates prevents the leader from moving back over the rear portion of the splicing block 24 and thus become unable to be retracted later into the cassette.

A guide 150 is fixed to the side of the first guide block 20 parallel to the vacuum track 22. This guide 150 extends upwardly above the first guide block 20 as can be seen by the hidden lines outlining the first guide block 20 behind the guide 150 in FIG. 12. The guide 150 extends in a smooth curve about its upper edge and beyond the end of the first guide block 20. This allows the leader to slide smoothly over this surface as it is being retracted into the cassette 32.

The guide 150 is configured such that it defines a large hook which, under certain conditions, would engage the loop of tape and prevent it from being drawn into the cassette. However, it has been found that the configuration provided is successful in guiding the tape back into the cassette following splicing because tape is drawn into the cassette only onto the reel 36. Thus, the tape is drawn over the guide roller 126 and the portion of the leader hanging free over the side of the guide 150 naturally follows the tape around the end of the guide 150. A bevel 152 is provided on the end of the guide 150 to further insure proper retraction of the tape. The bevel adds to the tendency of the tape to fall down past the end of the guide 150 such that it can be drawn into the cassette 32 to complete the loading process.

In drawing the tape back into the cassette 32, the tape has a tendency to drag across itself where the two sides of the loop cross right near the cassette 32 where the tape enters. To avoid this, the guide 144 includes a depending plate 154 having at its distal end an outwardly extending flange 156. The flange 156 extends to a point near the cassette and back of the intersection of the two sides of the loop of tape which is to return to the cassette. When the splicing block 24 moves outwardly, the flange 156 forces the side of the loop depending down from the splice block 24 away from the portion extending up and around the guide roller 126. In this way, cutting of one portion of the tape by the other can be avoided.

The several pneumatic cylinders employed in the guide means as well as the puff of air directed through rod 90 are controlled by means of a cam mechanism 158 as best seen in FIG. 1. The cam mechanism 158 includes a series of cams 160 mounted on and fixed to rotate with a shaft 162 which is driven by a timed power source. Followers 164 are associated with air valves 166 which gate the air to the pneumatic cylinders. In this way, the threading mechanism is properly sequenced.

Thus, an automatic threading mechanism for a cassette splicer and motor has been described. While embodiments and applications of this invention have been shown and described, it would be apparent to those skilled in the art that many more modifications are possible without departing from the inventive concepts herein described. The invention, therefore, is not to be restricted except by the spirit of the appended claims.

What is claimed is:

1. An automatic threading mechanism for a cassette loader, comprising
    an arm pivotally mounted to the cassette loader;
    a drive means for pivoting said arm in either direction;
    a shaft slidably mounted to said arm at a distal end of said arm and oriented substantially tangentially to the arc of pivotal movement of said distal end of said arm, said arm being located on the cassette loader to allow a first end of said shaft to contact a cassette mounted on the cassette loader immediately adjacent the leader of the cassette and said shaft having adjacent said first end a member extending perpendicularly to said shaft;
    a stop positioned to limit pivotal movement of said arm away from the cassette by intercepting a second end of said shaft; and
    means for rotating said shaft relative to said arm upon contact of said first end with the cassette and upon contact of said second end with said stop to draw leader from the cassette.

2. The automatic threading mechanism of claim 1 wherein said means for rotating said shaft includes a helix and follower mechanism to constrain said shaft to rotate with axial movement of said shaft relative to said arm.

3. The automatic threading mechanism of claim 2 wherein said helix is positioned to cause said member to assume an orientation parallel to the leader of a cassette positioned on the cassette loader when said second end contacts said stop and to cause said member to assume an orientation perpendicular to the leader of a cassette positioned on the cassette loader when said first end contacts the cassette.

4. The automatic threading mechanism of claims 2 or 3 wherein said helix is on said shaft and said follower is on said arm.

5. The automatic threading mechanism of claim 1 wherein said drive means includes a pneumatic cylinder pinned at a first end to the cassette loader and pinned at a second end to said arm at a point spaced from the pivotal mounting of said arm to the cassette loader.

6. The automatic threading mechanism of claim 2 wherein said follower is resiliently biased toward said helix.

7. An automatic threading mechanism for a cassette loader, comprising
    a leader placement head having a jaw assembly including a first jaw stationery relative to said head, a second jaw mounted to said head to pivotally close with said first jaw, said first jaw having a first surface opposed to said second jaw with no protrusive portions thereon and said second jaw having a second surface opposed to said first jaw with a protrusive member for engaging leader of a cassette mounted on the cassette loader, a spring for biasing said second jaw to an open position away from said first jaw, a lock for retaining said second jaw in a closed position with said first jaw, and a release for said lock.

8. The automatic threading mechanism of claim 7 further comprising a mount for said leader placement head, said mount being pivotally supported on the cassette loader and including means for controllably pivoting said mount, and extension means for extending and retracting said leader placement head relative to said mount.

9. The automatic threading mechanism of claim 8 wherein said extension means includes a pneumatic cylinder, said leader placement head being positioned on the piston shaft thereof, a rod fixed to said leader placement head and extending parallel to the piston shaft of said pneumatic cylinder, and a guide fixed to said pneumatic cylinder and extending to slidably engage said rod to hold said leader placement head in fixed angular orientation relative to said mount.

10. The automatic threading mechanism of claim 8 wherein said means for controllably pivoting said mount include a pneumatic cylinder pinned at a first end to the cassette loader and pinned at a second end to said mount at a distance from the pivotal support of said mount.

11. The automatic threading mechanism of claim 7 or 8 further comprising first and second stops fixed relative to the cassette loader to intercept the travel of said leader placement head, said second jaw including a finger fixed thereto and extending from said head to be acutated by movement of said head to said first stop, and said release extending from said head to be actuated by movement of said head to said second stop.

12. The automatic threading mechanism of claim 7 wherein said lock includes a pawl and notch mechanism and said release extends to said pawl to selectively disengage said pawl from said notch.

13. The automatic threading mechanism of claim 7 wherein said protrusive member includes a pin of circular cross-section rigidly fixed to said second jaw, said pin being at least as long a the width of leader of cassettes intended to be mounted on the cassette loader.

14. The automatic threading mechanism of claim 11 wherein said finger of said second jaw extends outwardly of said head past said first jaw to engage said first stop.

15. The automatic threading mechanism of claim 12 wherein said release extends through said first jaw parallel to the extension and retraction of said leader placement head by said extension means to be forced rearwardly by movement of said leader placement head to said second stop, said release thereby moving said pawl out of said notch.

16. An automatic threading mechanism for a cassette loader having a vacuum track for holding leader of a cassette during splicing, comprising
a leader pickup including an arm pivotally mounted to the cassette loader, a first drive means for pivoting said arm in either direction, a shaft slidably mounted to said arm at a distal end of said arm and oriented substantially tangentially to the arc of pivotal movement of said distal end of said arm, said arm being located on the cassette loader to allow a first end of said shaft to contact a cassette mounted on the cassette loader immediately adjacent the leader of the cassette and said shaft having adjacent said first end a member extending perpendicularly to said shaft, a first stop positioned to limit pivotal movement of said arm away from the cassette by intercepting a second end of said shaft and means for rotating said shaft relative to said arm upon contact of said first end with the cassette and upon contact of said second end with said first stop to draw leader from the cassette into a loop extending from the cassette; and
a leader placement assembly including a leader placement head having a first jaw assembly including a first jaw stationary relative to said head, a second jaw mounted to said head to pivotally close with said first jaw, said first jaw having a first surface opposed to said second jaw with no protrusive portions thereon and said second jaw having a second surface opposed to said first jaw with a protrusive member for engaging leader of a cassette mounted on the cassette loader, a spring for biasing said second jaw to an open position away from said first jaw, a lock for retaining said second jaw in a closed position with said first jaw, a release for said lock, a mount for said leader placement head, said mount being pivotally supported on the cassette loader and including means for controllably pivoting said mount and extension means for extending an retracting said leader placement head relative to said mount such that said leader placement head extends to the leader loop formed by said leader pickup;
a second stop fixed relative to the cassette loader to intercept the travel of said leader placement head to close said second jaw on the leader loop; and
a third stop fixed relative to the cassette loader adjacent the vacuum track to engage said release on said leader placement head immediately adjacent the vacuum track, said means for controllably pivoting said mount and said extension means being capable of controllably placing said leader placement head adjacent the vacuum track.

17. The automatic threading mechanism of claim 16 further comprising a tape guide assembly including a second arm pivotally mounted to the cassette loader to pivot toward and away from the cassette loader, said second arm having at a distal end thereof a notch to receive leader from a cassette mounted on the cassette loader as said arm pivots outwardly, said arm being located to intercept one side of a loop of leader drawn from a cassette mounted on the cassette loader once said leader placement assembly has retracted by said extension means.

18. An automatic threading mechanism for a cassette loader having a vacuum track for holding leader of a cassette mounted on the cassette loader during splicing, comprising
a leader placement head pivotally and extendably mounted to the cassette loader to draw leader from a cassette and lay the leader across the vacuum track; and
a tape guide assembly including an arm pivotally mounted to the cassette loader to pivot toward and away from the cassette loader, drive means for pivotally moving said arm, said arm having at a distal end thereof a notch to receive leader from a cassette as said arm pivots outwardly, said arm being located to intercept one side of a loop of leader drawn from a cassette mounted on the cassette loader once said leader placement head has drawn leader from the cassette.

19. The automatic threading mechanism of claim 18 further comprising a guide positioned adjacent and parallel to the vacuum track, said guide extending upwardly above said vacuum track and extending beyond an outer end of said vacuum track, the periphery of said guide being a smooth curve to permit leader extending over said guide to slide smoothly over said periphery.

20. The automatic threading mechanism of claim 19 wherein said arm is elongated to retain one side of a loop of leader over said guide when said head extends to place leader on said vacuum track.